(12) United States Patent
Abate et al.

(10) Patent No.: US 8,848,020 B2
(45) Date of Patent: Sep. 30, 2014

(54) AUTO FOCUS

(75) Inventors: Umberto Abate, London (GB); Michael Bartlett, London (GB); Dmytro Izotoy, London (GB); Ole Mahrt, London (GB); Torsten Rehberg, London (GB); Simon Tickner, Whitstable (GB); Hando Tint, Tartu (EE)

(73) Assignee: Skype, Dublin (IE)

( * ) Notice: Subject to any disclaimer, the term of this patent is extended or adjusted under 35 U.S.C. 154(b) by 361 days.

(21) Appl. No.: 13/274,053

(22) Filed: Oct. 14, 2011
(Under 37 CFR 1.47)

(65) Prior Publication Data

US 2012/0182381 A1    Jul. 19, 2012

(30) Foreign Application Priority Data

Oct. 14, 2010    (GB) .................................. 1017382.1

(51) Int. Cl.
*H04N 7/14* (2006.01)
*H04L 12/18* (2006.01)
*H04M 3/56* (2006.01)

(52) U.S. Cl.
CPC .................................. *H04L 12/1822* (2013.01); *H04M 3/56* (2013.01)
USPC ................... 348/14.07; 348/14.01; 348/14.08; 370/260; 379/202.01; 709/204

(58) Field of Classification Search
CPC ............................................. H04M 3/56–3/569
USPC ..................... 348/14.01–14.16; 370/259–271, 370/351–357; 455/412.1–426.2, 455/456.1–560, 575.1–575.9, 90.1–90.3; 704/270–278; 709/201–207, 217–248
See application file for complete search history.

(56) References Cited

U.S. PATENT DOCUMENTS 6,128,649 A * 10/2000 Smith et al. .................... 709/217
6,922,718 B2 * 7/2005 Chang ........................... 709/204

(Continued)

FOREIGN PATENT DOCUMENTS

GB    2384932 A    8/2003
JP    07336660    12/1995

(Continued)

OTHER PUBLICATIONS

Search Report issued in Great Britain application No. GB1017382.1, Date of Search: Feb. 16, 2011, 2 pp.

(Continued)

*Primary Examiner* — Hemant Patel
(74) *Attorney, Agent, or Firm* — Sonia Cooper; Jim Ross; Micky Minhas

(57) ABSTRACT

A method of controlling a user interface to display participants of a call in dependence upon the participants' speech activity in the call, the method including monitoring the speech activity of the participants in the call and determining whether a participant is an active participant or an inactive participant in dependence on the participants' speech activity over a minimum time period of the call. In response to determining whether a participant is an active or inactive participant, an active participant is displayed in a first area of the user interface and an inactive participant is displayed in a second area of the user interface. The first area of the user interface is larger than the second area of the user interface.

47 Claims, 10 Drawing Sheets

(56) References Cited

U.S. PATENT DOCUMENTS

| | | | |
|---|---|---|---|
| 7,006,122 B2* | 2/2006 | Suzuki | 348/14.08 |
| 7,113,200 B2* | 9/2006 | Eshkoli | 348/14.07 |
| 7,768,543 B2* | 8/2010 | Christiansen | 348/14.08 |
| 8,447,023 B2* | 5/2013 | Nimri et al. | 379/202.01 |
| 2002/0093531 A1* | 7/2002 | Barile | 345/753 |
| 2003/0145324 A1* | 7/2003 | Caviedes et al. | 725/46 |
| 2005/0099492 A1* | 5/2005 | Orr | 348/14.08 |
| 2006/0187970 A1* | 8/2006 | Lee et al. | 370/516 |
| 2007/0230372 A1* | 10/2007 | He et al. | 370/260 |
| 2008/0136898 A1* | 6/2008 | Eisenberg et al. | 348/14.09 |
| 2009/0195638 A1 | 8/2009 | Caspi et al. | |
| 2009/0199078 A1 | 8/2009 | Caspi et al. | |
| 2009/0220064 A1* | 9/2009 | Gorti et al. | 379/202.01 |
| 2010/0085419 A1* | 4/2010 | Goyal et al. | 348/14.09 |
| 2010/0171807 A1* | 7/2010 | Tysso | 348/14.09 |

FOREIGN PATENT DOCUMENTS

| | | |
|---|---|---|
| WO | WO 02/058390 A1 | 7/2002 |
| WO | WO 2007/103412 A2 | 9/2007 |
| WO | WO 2009/004731 A1 | 8/2009 |

OTHER PUBLICATIONS

Notification of Transmittal of the International Search Report and the Written Opinion of the International Searching Authority, or the Declaration; International Application No. PCT/EP2011/068046; Date of Mailing: Feb. 13, 2012, 16 pp.

* cited by examiner

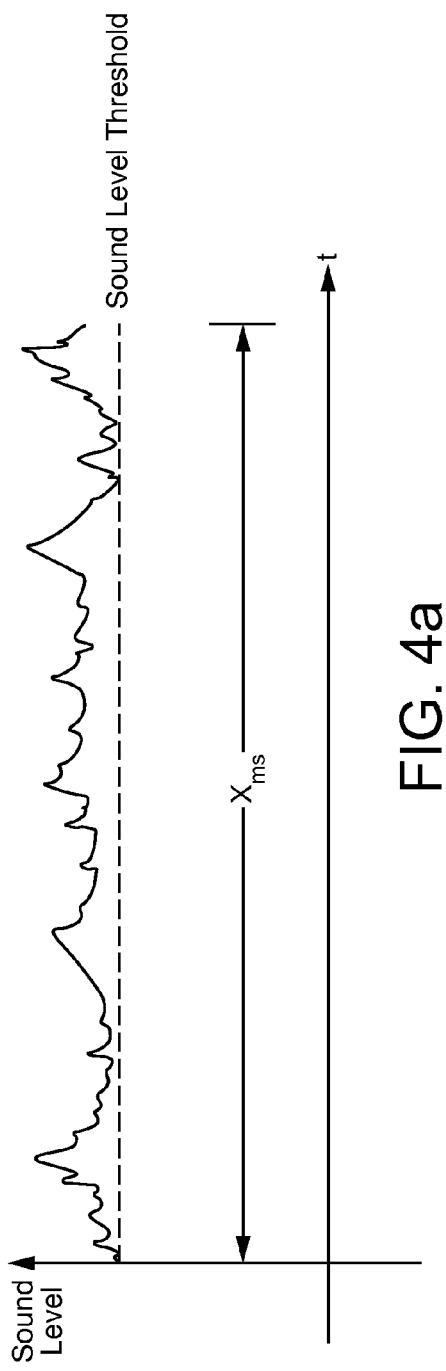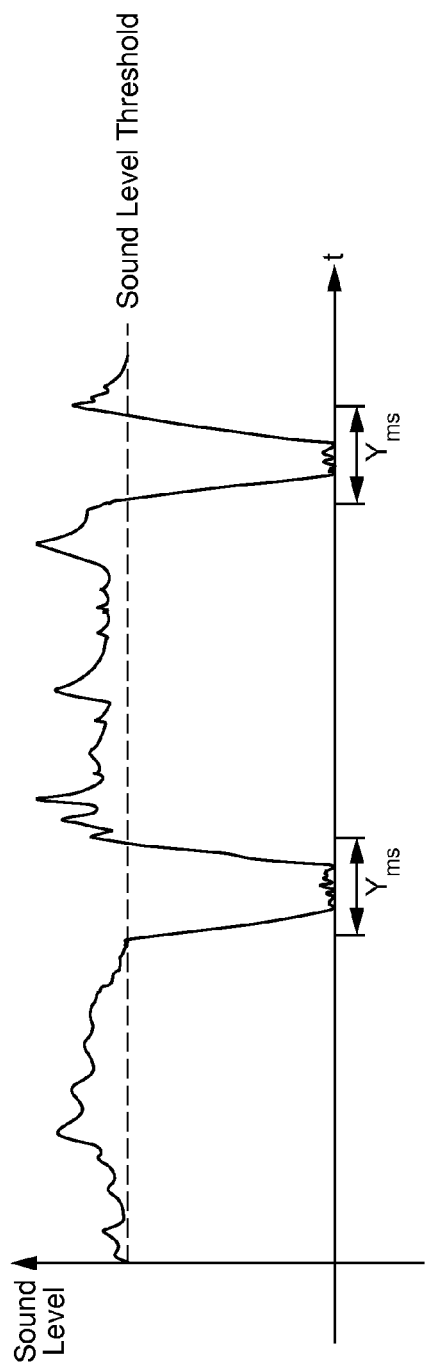

AUTO FOCUS

RELATED APPLICATION

This application claims priority under 35 U.S.C. §119 or 365 to Great Britain Application No. GB 1017382.1, filed Oct. 14, 2010. The entire teachings of the above application are incorporated herein by reference.

TECHNICAL FIELD

The present invention relates to a method of controlling a user interface in a conference call.

BACKGROUND

Packet-based communication systems allow the user of a device, such as a personal computer, to communicate across a computer network such as the Internet, in which case the packet protocol may be Internet Protocol (IP). Packet-based communication systems can be used for video communications. These systems are beneficial to the user as they are often of significantly lower cost than fixed line or mobile networks. This may particularly be the case for long-distance communication. To use a packet-based system, the user must install and execute client software on their device. Such client software can establish voice and video calls.

In a video communication system, during a video call, a first user's terminal will receive video and speech data from a second user's terminal. The received video data typically comprises real-time video of the second user's face or body during the call. The received video data will typically be displayed in a main video area of a display on the first user's terminal. The video data is encoded by an encoder at the second user's terminal for transmission to the first user's terminal. The received video data is then decoded by a decoder at the first user's terminal.

These video communication systems allow for video conferences between a plurality of users. In such systems received video data from the plurality of users will typically be displayed in a main video area of a display on each of the user's terminals The Polycom® CX5000 is a device that can be used in collaboration to Microsoft® Office Live Meeting 2007 and Microsoft® Office Communications Server 2007. The Polycom® CX5000 device comprises a plurality of cameras to provide a panoramic view of a video conference. A user interface displays all of the participants in a panoramic display area which comprises a display area for each of the participants. When a participant of the video conference is speaking they are displayed in the panoramic display area with the other participants of the video conference, in addition to being displayed in an active speaker area of the user interface. The active display area is larger than a participants display area in the panoramic display area. Therefore the relative size of the video display for the participant who is currently speaking is changed to fit the active display area, whilst the display of the active speaker in the panoramic display area remains the same size. This enables the current speaker of the video conference to be more clearly displayed at the user terminals of the plurality of users.

In this system the active participant is determined based on an instantaneous assessment of the participant's activity in the video call and the display of the active participant is changed accordingly.

SUMMARY

The inventors have realized that this system has a number of disadvantages.

Firstly, during a video call with a plurality of users who are all actively participating and contributing to the conversation, the system will frequently change the way in which the video is presented due to the instantaneous assessment of each of the participant's activity in the video call. This may cause the user to feel dizzy or be a distraction to the video call itself. Secondly, frequently adapting the way in which different video streams are rendered on the screen causes greater processing demands on the user terminals. Greater processing demands may also be placed on both the near side decoder and the far end encoder particularly in the case where encoding and/or decoding modes are dependent on the presentation size of the image.

There is therefore a need for a technique to address the aforementioned problems with controlling the display of participants in a video call.

According to a first aspect of the present invention, there is provided a method of controlling a user interface displayed on a user terminal to display participants of a call, the method comprising: storing a plurality of predetermined display configurations in a storage means of said user terminal; receiving a selection signal from a user in the call via the user interface, and responsive to receiving the selection signal selecting one of the predetermined display configurations from the storage means; and monitoring the speech activity of the participants in the call.

Preferably, the method further comprises displaying the participants of the call in a plurality of locations of the selected predetermined display configuration in dependence on the speech activity of the participants in the call.

According to a second aspect of the present invention, there is provided a method of controlling a user interface to display participants of a call in dependence upon the participants' speech activity in the call, the method comprising: monitoring the speech activity of the participants in the call; determining whether a participant is an active participant or an inactive participant in the call in dependence on the participants' speech activity over a minimum time period of the call, wherein in response to determining that a participant is an active participant, displaying said participant in a first area of the user interface wherein an inactive participant is displayed in a second area of the user interface, said first area of the user interface being larger than said second area of the user interface.

This advantageously allows for a reduction in the number of times the user interface is required to change the manner in which the received data streams are rendered to the screen. This improves the user experience and decreases the processing requirements.

Preferably, the step of displaying the participant comprises displaying an image representing the participant.

Preferably, the step of determining is implemented at predetermined time intervals during the call, and wherein an automatic transition of a participant between the first and the second area of the user interface is effected responsive to the determining step at said predetermined time intervals.

Preferably, a participant is determined to be an active participant if the speech activity of the participant in the call is above a predetermined threshold for said minimum time period, Alternatively or additionally a participant is determined to be an active participant if a predetermined number of pauses between the speech activity within said minimum time period is not exceeded.

Determining whether a participant is an active participant or an inactive participant in the call may be individually assessed for each participant. Alternatively, determining whether a participant is an active participant or an inactive participant in the call may be based on a comparison between the speech activity of all the participants in the call.

Preferably, a manual override comprises manually controlling the user interface to display participants in the first or second areas of the user interface regardless of speech activity.

A manual override may display participants in the first or second areas of the user interface regardless of the result of the determining step at a subsequent time interval.

Alternatively, the manual override may be terminated upon commencing the determining step of a subsequent time interval.

Preferably, the participants may be arranged on the display in one of a set of predetermined display configurations, said one being selected in dependence on said comparison.

An automatic transition of a participant between areas of the predetermined display configuration may be effected responsive to the determining step at said predetermined time intervals.

Alternatively, one of the set of predetermined display configurations may be selected as a result of a determining step at a subsequent time interval.

The above aspects of the invention may be implemented either independently or in conjunction with another e.g. the first aspect may be used to select a predetermined display configuration, and any of the above embodiments of the second aspect may be used to display the participants within the selected display configuration in dependence on the monitored speech activity.

Another aspect of the present invention provides a user terminal that is controlled to display participants of a call in dependence upon the participants' speech activity in the call, the user terminal comprising: a display configured to display a user interface having first and second areas, said first area of the user interface being larger than said second area of the user interface; means for monitoring the speech activity of the participants in the call; means for determining whether a participant is an active participant or an inactive participant in the call in dependence on the participants' speech activity over a minimum time period of the call; and means for controlling the user interface to display the participants of the call in dependence upon said determination, wherein in response to determining that a participant is an active participant, said active participant is displayed in a first area of the user interface and an inactive participant is displayed in a second area of the user interface.

The user terminal may be configured to perform any of the above method features.

The invention also provides a computer program product; the program comprising code which when executed on a processor performs the steps of any of the above-defined method features.

In a further aspect, the invention provides a communication system comprising a plurality of user terminals connected to a communication network, wherein at least one user terminal of the plurality of user terminals is as hereinabove defined.

BRIEF DESCRIPTION OF THE DRAWINGS

For a better understanding of the present invention and to show how the same may be put into effect, reference will now be made, by way of example, to the following drawings in which:

FIGS. 4a, 4b, 4c show example speech signals of participants in a video call;

DETAILED DESCRIPTION OF THE INVENTION

Figure 1:
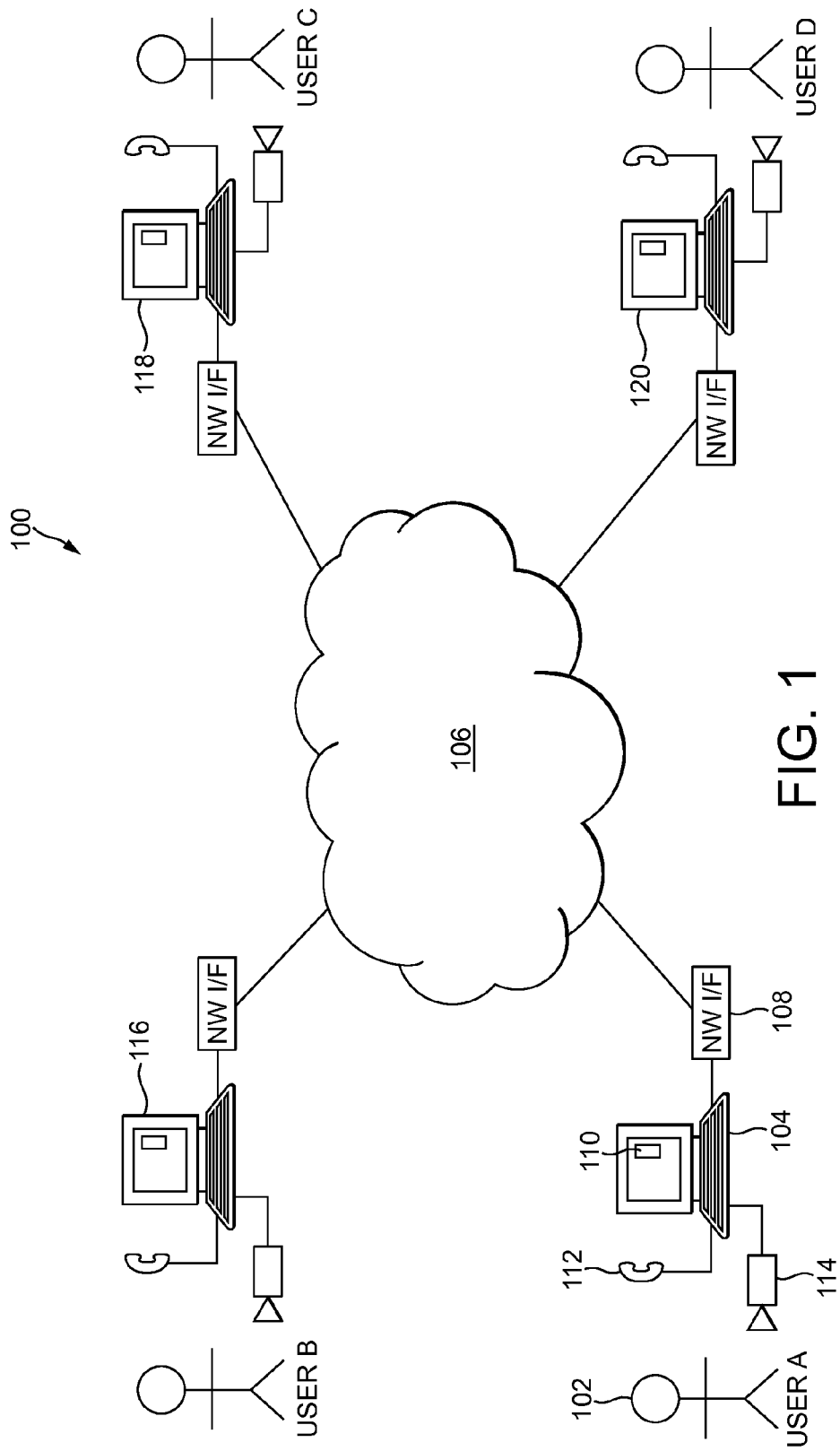
FIG. 1 shows a packet-based communication system.

Reference is first made to FIG. 1, which illustrates a communication system 100. Note that the communication system could be a peer to peer communication system or a server based communication system. A first user of the communication system (named "User A" 102) operates a first user terminal 104, which is shown connected to a network 106. Note that the network 106 utilizes a packet-based communication system such as the Internet. The user terminal 104 may be, for example, a personal computer ("PC"), personal digital assistant ("PDA"), a mobile phone, a gaming device or other embedded device able to connect to the network 106. This user device is arranged to receive information from and output information to a user of the device. In a preferred embodiment of the invention the user device comprises a display such as a screen or monitor, and a keyboard and mouse. The user device 104 is connected to the network 106 via a network interface 108 such as a modem, and the connection between the user terminal 104 and the network interface 108 may be via a cable (wired) connection or a wireless connection.

The user terminal 104 is running a client 110, provided by a software provider. The client 110 is a software program executed on a local processor in the user terminal 104. The user terminal 104 is also connected to a handset 112, which comprises a speaker and microphone to enable the user to listen and speak in a call. The microphone and speaker does not necessarily have to be in the form of a traditional telephone handset, but can be in the form of a headphone or earphone with an integrated microphone, or as a separate loudspeaker and microphone independently connected to the user terminal 104. The user terminal 104 is also connected to a video camera 114 such as a web-cam.

A plurality of further user terminals 116,118,120 may be connected to the network 106, comprising similar elements to that of the first user.

The client 110 provides a user interface that is displayed on the user terminal 104. The user interface comprises a button labeled "contacts", and when this button is selected the contacts stored by a user in a contact list are displayed. Calls such as voice and video calls to the users in the contact list may be initiated over the communication system by selecting the contact and clicking on a "call" button using a pointing device such as a mouse.

In a conference call between Users A, B, C, and D, the client 110 executed at the first user terminal 104 performs the encoding (for transmission) and decoding (for received packets) of voice and/or video IP packets. Voice and/or video IP packets from the user terminal 104 are transmitted into the network 106 via the network interface 108, and routed to user terminals 116, 118 and 120 of the called parties (User B, C and D) via network interfaces. Clients (similar to the client 110) running on the user terminals of the called users decode the voice and/or video IP packets to produce an audio and/or video signal that can be heard and seen by the called users on their terminals 116,118,120.

In the event that a user of the call does not transmit video data to the other users in the call then an avatar associated with that user is displayed in the clients running on the user terminals in the call. The avatar image could be an actual representation in the form of a photograph of the user; or a symbolic representation such as of a favorite cartoon character, animal, object, abstract image; or indeed any image chosen by the user to appear to other users of the same packet-based communication system.

Figure 2:
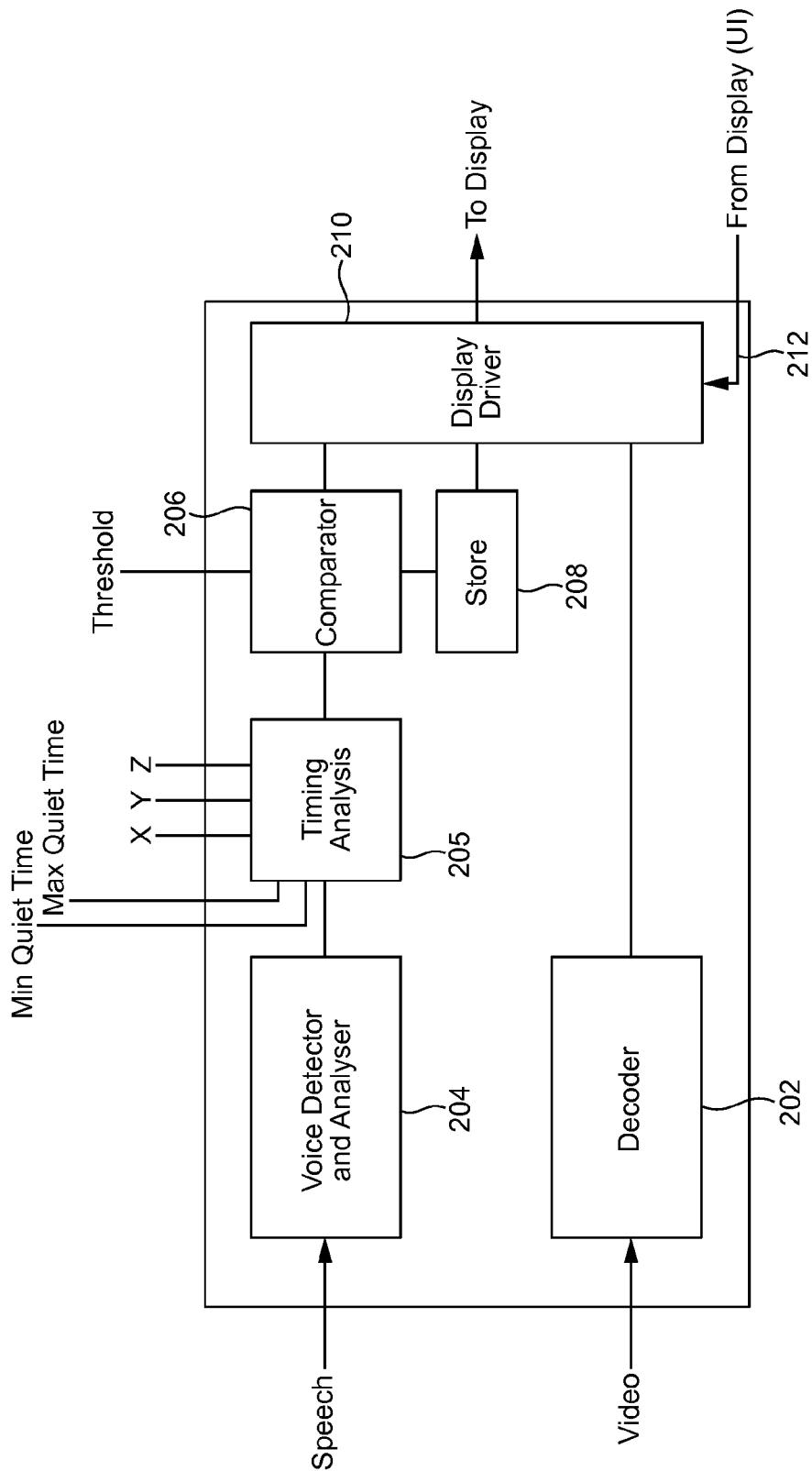
FIG. 2 shows a detailed view of a sub-section of a user terminal.

FIG. 2 illustrates a detailed view of a sub-section of the user terminal 104.

During a call user terminal 104 receives speech and video data from User A 102 via the handset 112 and the web-cam 114 respectively. The User terminal 104 also receives speech and video data over the network 106 from users B, C, and D at the plurality of further user terminals 116,118,120 respectively.

The video data is received at a decoder 202 which decodes the video data and sends the decoded video data to a display driver 210. A voice detector and analyzer 204 detects when speech is received at the user terminal 104. The voice detector and analyzer 204 analyses the speech data that is received from the voice detector 204 and outputs a parameter e.g. a sound level for User A 102 that is sent to a timing analysis block 206. Timing analysis block 205 analyses the sound level using a predetermined set of time intervals X, Y, Z and variables "MinQuietTime" and "MaxQuietTime" that are set by the system and are input to timing analysis block 205. The results of the timing analysis block 205 are sent to a comparator 206 which determines whether the users in the video call are active or inactive participants in the call using a sound level threshold value input to comparator 206. The operation of the comparator 206 is fully described in detail below. If the parameter to be compared is a sound level, the threshold value is a sound level.

The determination by the comparator 206 is passed to a display driver 210 to automatically control the display, or to a memory store 208. Memory store 208 stores a plurality of templates (predetermined display configurations) that may be used to display the users in the call. In response to receiving the determination of active and/or inactive participants in the call from the comparator 206, the memory store sends the appropriate template to the display driver 210.

The display driver 210 controls the user interface to output a display of Users A, B, C, and D of the video call in dependence on the determination received from comparator 206 or the predetermined display configuration received from memory store 208.

Figure 3:
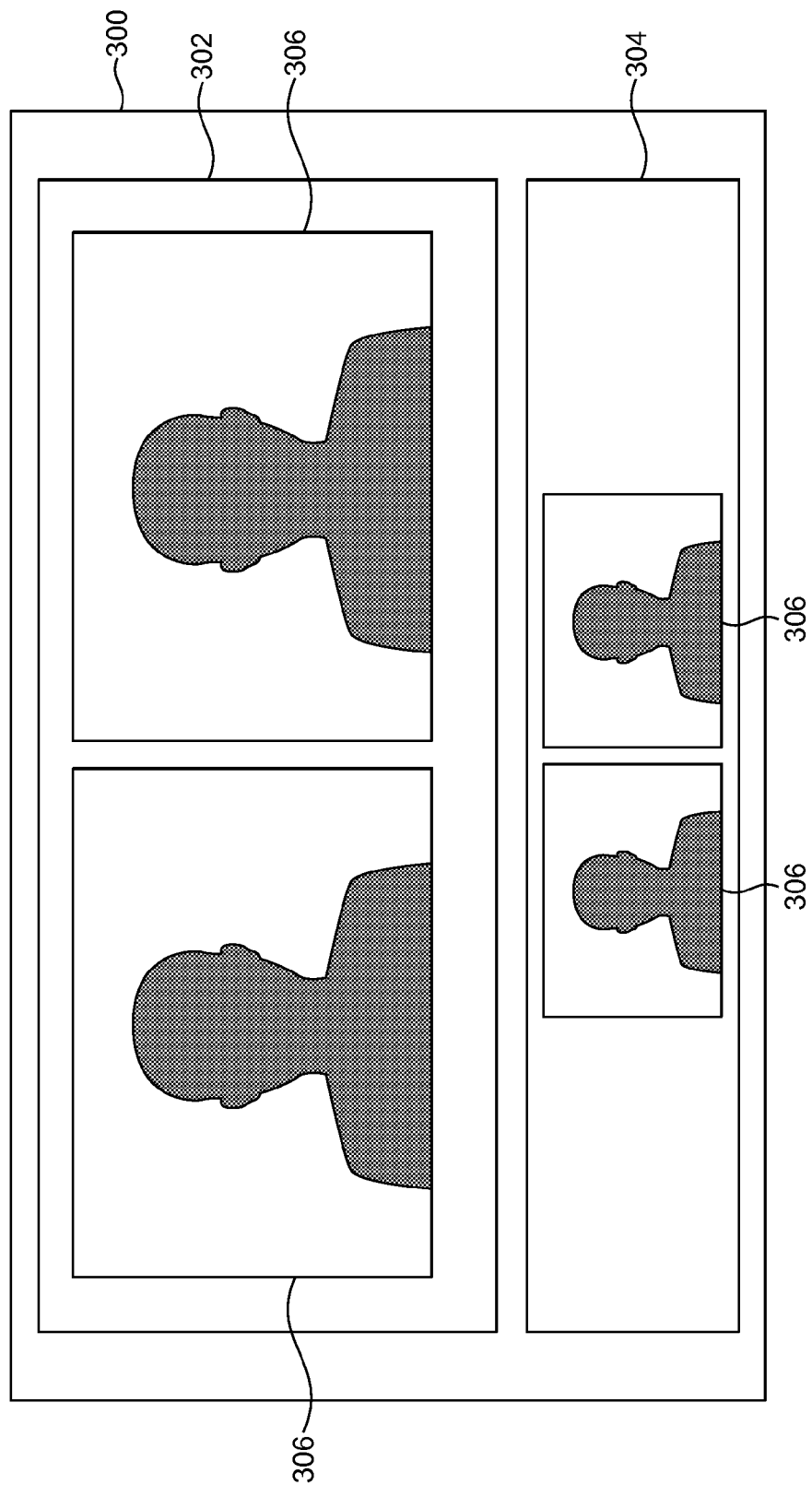
FIG. 3 shows a user interface of a client executed on a user terminal.

A manual override line 212 is input to the display driver 210. The manual override line 212 receives an input from the display 300 (as shown in FIG. 3) when User A 102 makes a selection in the user interface. The type of selection and the operation of the manual override is fully described in detail below.

As illustrated in FIG. 3 the first user's terminal 104 has available a display area 300 for displaying the participants of the call. This display area 300 could be a panel in the client front-end, a separate window from the client, or a full-screen display. The display area 300 comprises a larger, first area 302 (the stage) which displays an image received from active participants in the call.

Each of the active participants' image 306 is displayed in the stage 302 and is sized to fit the stage area 302.

The display area 300 also comprises a smaller, second area 304 (the roster) which displays an image received from inactive participants in the call.

Each of the inactive participants' image 306 is displayed in the roster area 304. It will be appreciated that as the size of the roster is smaller than the stage, as shown in FIG. 3, the inactive participants' image 306 will sized to fit the roster area 304 and will be visually less prominent than the active participants' image 306 in the stage area 302.

During a call, if a user has a web-cam connected to their user terminal then the real-time video data will be displayed as the user's image 306 and will be displayed at the user terminals of the users in the call.

During a call, the transmission of a user's video data to the other user terminals connected in the call may be stopped. This may be done by way of an intentional act by the user, for example the user turning their webcam off, disconnecting their webcam from their user terminal, or making a selection in the user interface provided by the client to only transmit voice data. Alternatively this may be done unintentionally, for example a user may have technical issues with their webcam. If during a call, the transmission of a user's video data to the other user terminals connected in the call is stopped then their avatar that is used in the client software will be displayed as the image 306.

In the event that a user of the video call does not have the hardware capable of transmitting video data in a call i.e. the user does not have a web-cam 114 connected to their user terminal then their avatar that is used in the client software will be displayed as the image 306.

It will now be described how the display of the participants is resized based on the conversation flow in a video call under normal rules.

When a video call is commenced between a plurality of users, before any of the users start talking it will be appreciated that the users may all be displayed in the stage area 302, the users may all be displayed in the roster area 304, or one or more users may be displayed in the stage area 302 and one or more users may be displayed in the roster area 304.

During the connecting phase the users arranged in the stage area 302 and roster area 304 can be ordered alphabetically by the participant's name or display name (username).

Figure 6A:
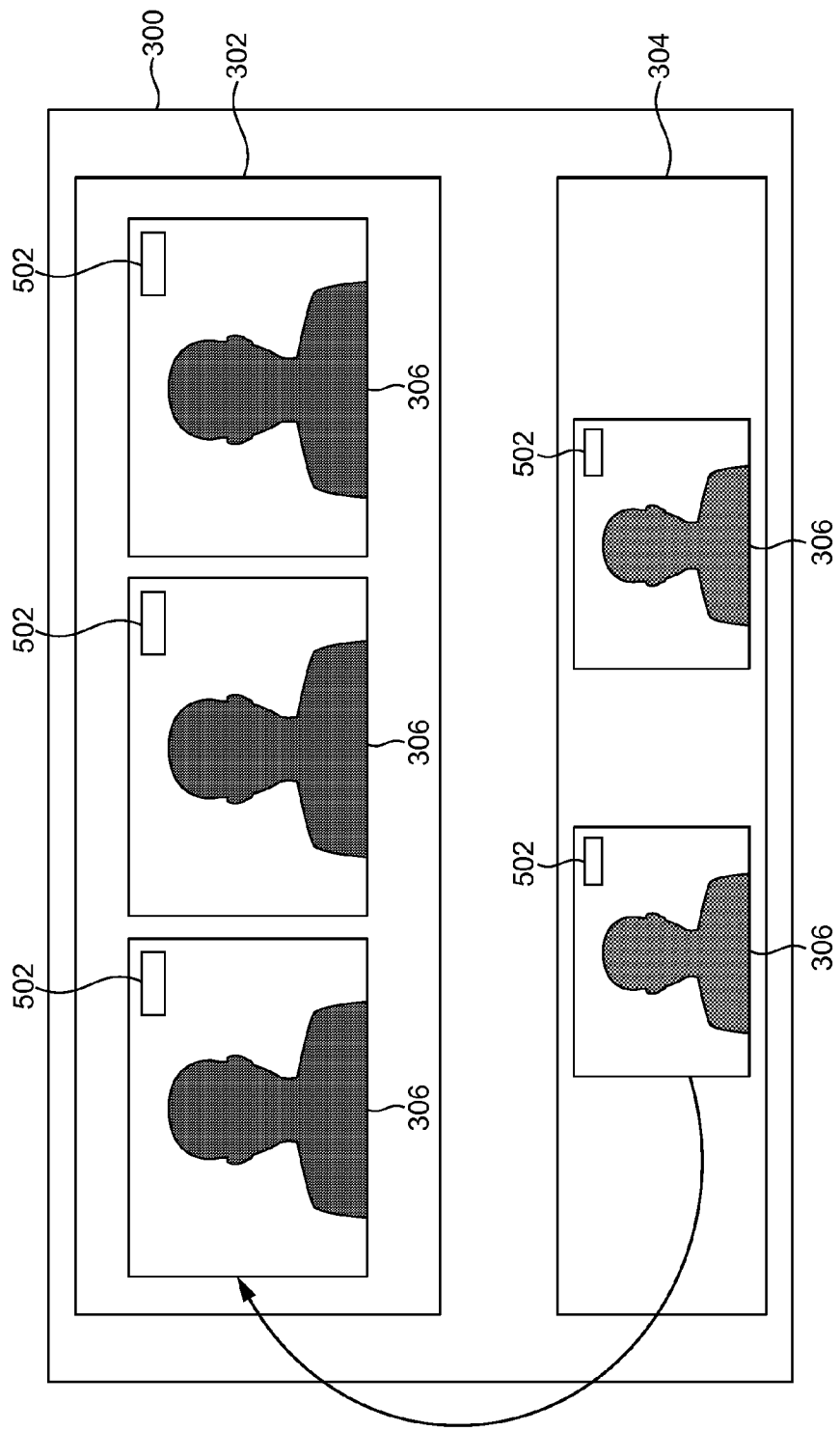
FIGS. 6a, 6b and 6c show how a participant of a video call may be manually displayed in a certain location of the user interface.
Figure 6B:
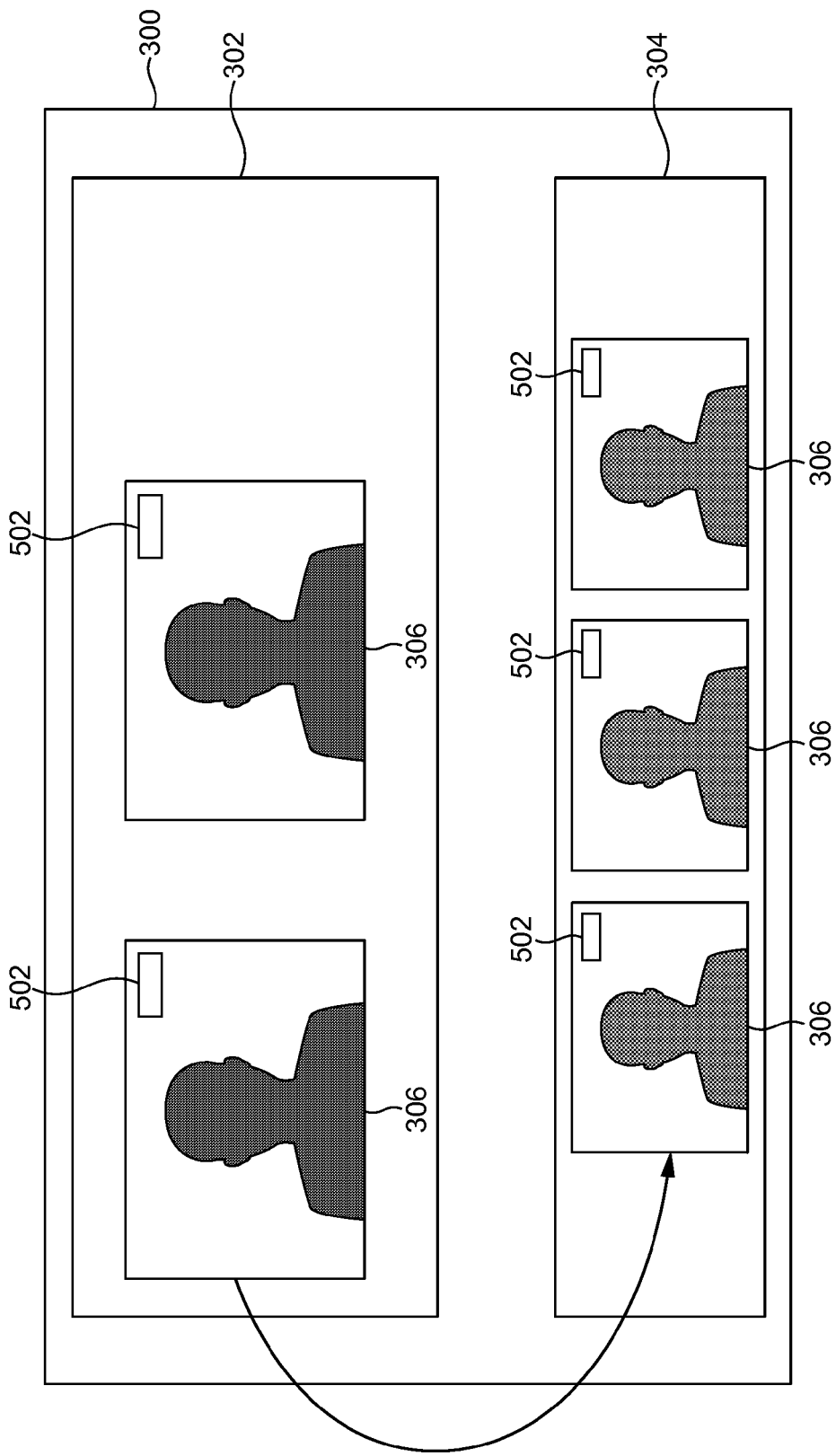
Figure 6C:
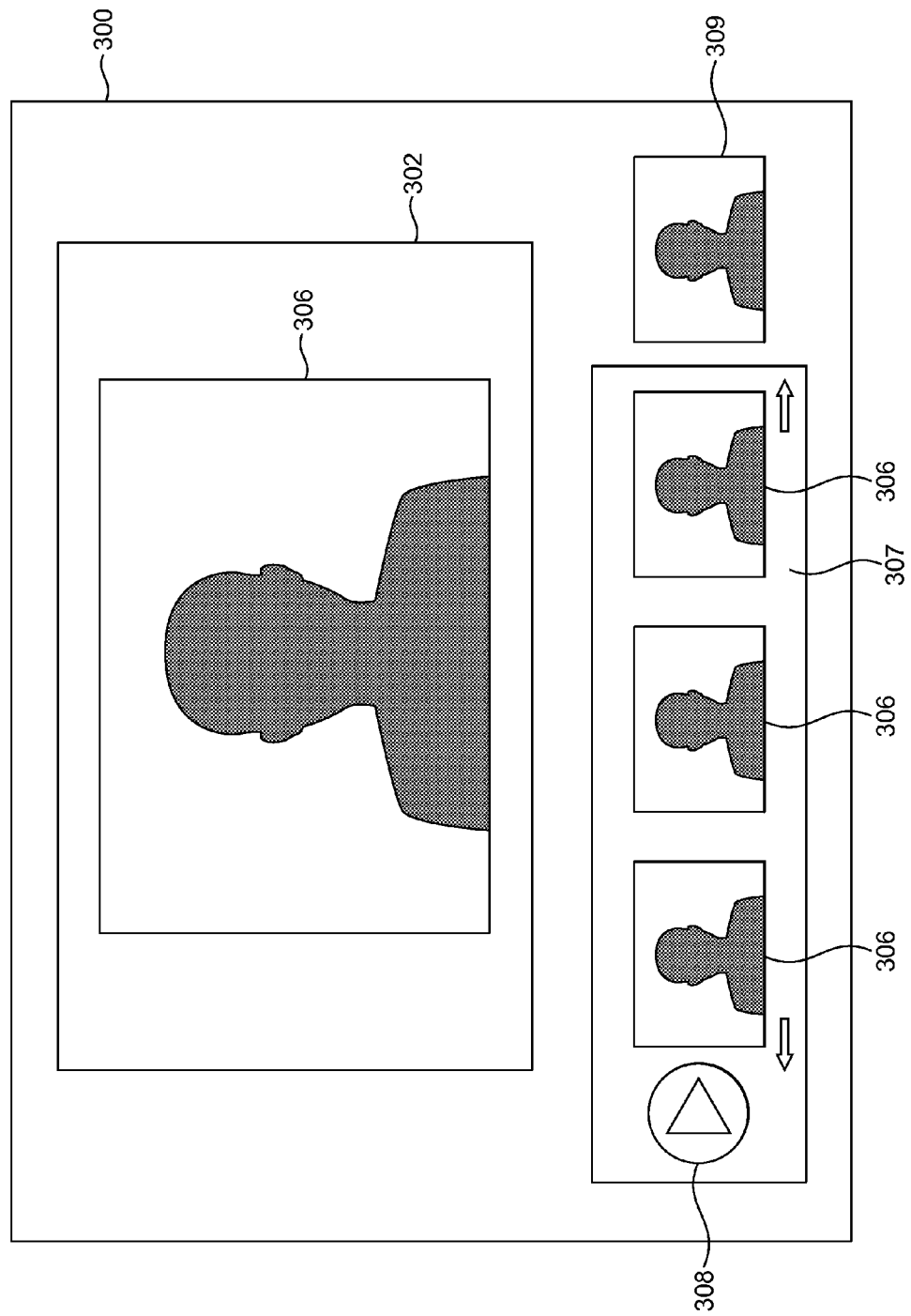

The roster can be configurable to have a scrollable area 307 (FIG. 6C). For example, if there are more inactive participants in a video call than can be displayed in the roster area 304, a user can scroll the plurality of video or avatars 306 in the roster to display other inactive participants in the roster area 304.

The speech activity of each of the users in the video call is monitored by the timing analysis block 205 at predetermined time intervals. The predetermined time interval is typically in the order of seconds i.e. 1 second. It will be understood this value of the predetermined time interval is merely an example and is not limiting in any way. At these predetermined intervals the comparator 206 determines whether each user in the video call is an active participant or an inactive participant by comparing a user's sound level received from timing analysis block 205 with the sound level threshold.

During a call, a user's own image 309 may optionally be displayed on their own user terminal, to one side in the roster area 304 e.g. to the right-hand side in roster area 304. A user's own image in roster area 304 does not form part of the scrollable area—i.e. will remain fixed in the roster area 304.

The comparator 206 determines that a user is an active participant in the video call if a user's sound level is above the sound level threshold for a minimum time period (Xms). The user's sound level is defined as the volume level of the user's speech. Alternatively, the signal to noise ratio of the user's speech could also be used a parameter of the user's sound level. Furthermore the user's speech signal may be filtered to only include human voice frequencies and the user's sound level may be determined based on a frequency level within these human voice frequencies.

FIG. 4a shows an example speech signal of an active participant in the video call.

Alternatively or additionally the comparator 206 determines that a user is an active participant in the video call if a predetermined number of pauses of length (Yms) within the minimum time period is not exceeded. FIG. 4b shows a further example speech signal of an active participant in the video call.

If a user is being displayed in the roster area 304 i.e. is an inactive participant, and at a subsequent time interval the comparator 206 determines that the user is an active participant of the video call, the user is elevated to the stage area 302 and the display of the active participant will be resized accordingly so the active participant is visually more prominent to the other users of the video call.

It will be understood that if the user is being displayed in the stage area 302 i.e. is an active participant, and at a subsequent time interval the system determines that the user is an active participant of the video call, the user will remain in the stage area 302 and no resizing of the display of the active participant will take place.

Figure 4C:
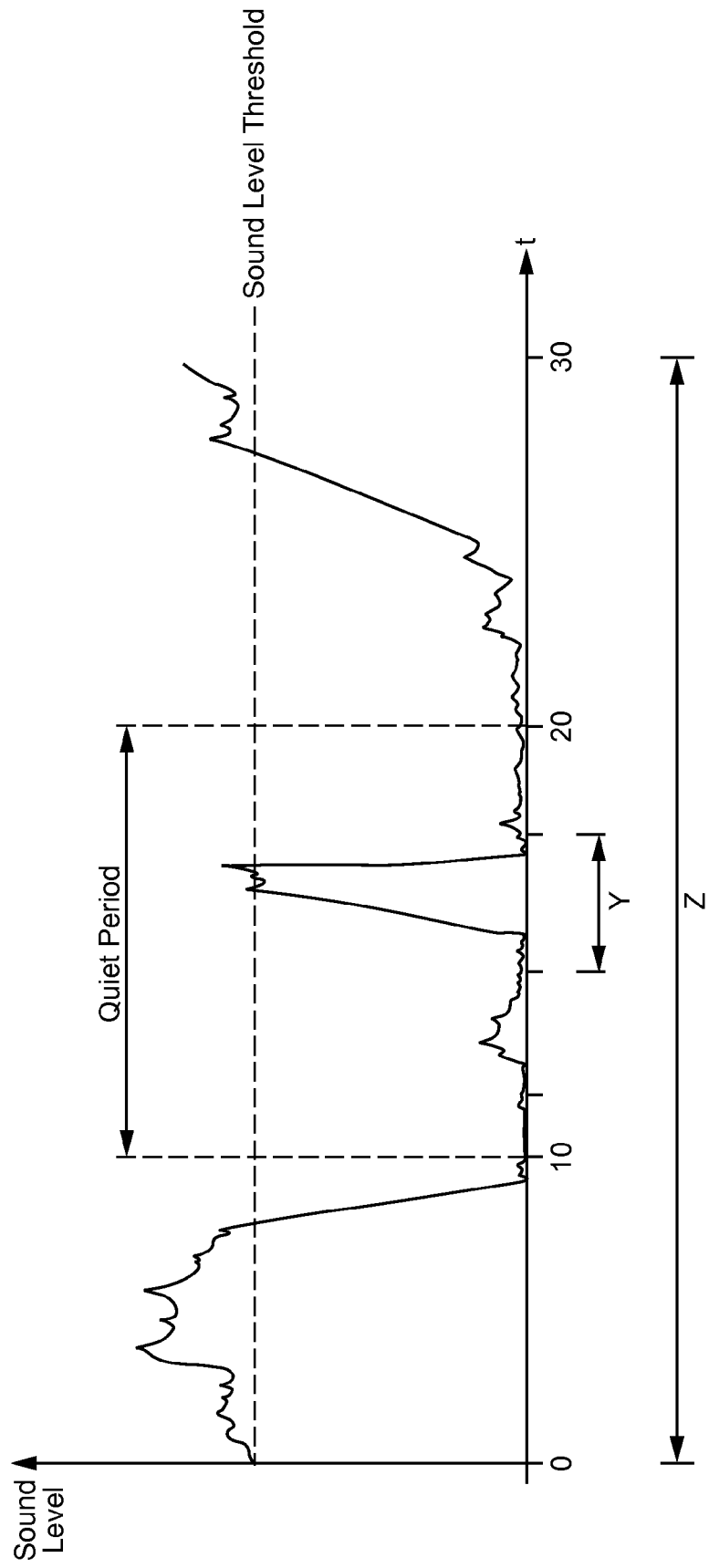

The system determines that a user is an inactive participant in the video call when he has been quiet for a "QuietPeriod". FIG. 4c shows an example speech signal of an inactive participant in the video call.

The timing analysis block 205 analyses the sound level of the user's speech activity within the last Z seconds. The value of Z is typically in the order of seconds i.e. 30 seconds. It will be understood that this value of Z is merely an example and is not limiting in any way.

The comparator compares the user's sound level received from timing analysis block 205 with the sound level threshold over a QuietPeriod, this QuietPeriod is shown in FIG. 4c. The QuietPeriod is a time period within the last Z seconds and is defined by variables "MinQuietTime" and "MaxQuietTime" that are input into the timing analysis block 205. The QuietPeriod is the time period between MinQuietTime and MaxQuietTime.

By way of example, FIG. 4c shows the variable MinQuietTime equal to 10 seconds and the variable MaxQuietTime equal to 20 seconds. In this example the system determines whether the user has been quiet within this 10 second time period between MinQuietTime and MaxQuietTime.

The variables MinQuietTime and MaxQuietTime are fixed by the system and are the same in client 110 on user terminal 104 as in the clients (similar to the client 110) running on the user terminals 116, 118, 120. In one embodiment, the users in the video call (for example User A 102 and Users B-D shown in FIG. 1) have no control over the values of the variables MinQuietTime and MaxQuietTime.

A user is demoted from the stage 302 when he has been quiet for the QuietPeriod. Being quiet is defined as the user's sound level being below the threshold level for the QuietPeriod with a maximum allowed interval (Yms) of the speech signal that is above the threshold within the QuietPeriod. This allows for random glitches or coughs to occur without causing a user to be demoted.

The interval Y that is used in determining whether a user is an inactive participant (shown in FIG. 4c) may be the same value as the value of Y (shown in FIG. 4b) that is used in determining whether a user is an active participant. Alternatively the value of Y that is used in determining whether a user is an inactive participant can be set to a different value to the value of Y that is used in determining whether a user is an active participant. It will be understood that the values of X, Y, and Z can be set as per the system requirements. The value of X and Y are typically in the order of seconds i.e. X=1 second and Y=0.5 seconds. It will be understood that these values of X and Y are merely an example and are not limiting in any way.

The longer the QuietPeriod is, the longer it takes for the user to be considered worthy of demoting. The reason for this is to make sure that people who just make short remarks are removed from stage area 302 sooner than people who are participating actively in the conversation for long periods of time.

As previously described, the speech activity of each of the users in the video call is monitored by the timing analysis block 205 at predetermined time intervals and no transitions occur between these intervals. This provides a minimum interval between two subsequent transitions of users between the stage area 302 and the roster area 304 thus avoiding excessive movement of the users in the display area 300.

During a video call, when a user starts speaking in the video call and none of the other users are speaking, instead of demoting participants one by one, the layout remains in its current state for a period of time, T1. This period of time T1 is longer than the period of time it normally takes to demote a participant i.e. the QuietPeriod. This is done to improve visual continuity in the layout as any of the other users speaking is likely to be related to the conversation that was previously displayed on the screen. If the user remains to be the only speaker for long enough i.e. T1, the layout changes according to the normal rules as described above.

In one embodiment, during a video call, when a participant is demoted from the stage area 302 to the roster area 304, the demoted participant's video or avatar 306 appears furthest to one side in the roster area 304 e.g. to the left-hand side in the roster area 304. This way, the order of participants arranged in the roster 304 is dynamically altered to always display the most recently demoted participants on the left-hand side of the roster area 304.

During a video call, when the type of call changes due to new users joining or existing users leaving the video call, instead of immediately altering the layout of the display area 300, the layout remains in its current state for a period of time. This can be of the order of length T1. This prevents excessive movement of the users between the stage area 302 and roster area 304 of display area 300 should network connections be unstable resulting in users dropping out of the video call and then quickly re-joining the video call.

Whilst it has been described how the display of the participants is resized based on the conversation flow in a video call under normal rules, it will be appreciated that during a conference call wherein a user in the call transmits audio data and does not transmit video data to the other user terminals, the avatar of this user will move between the stage area 302 and the roster area 304 and be resized accordingly based on the rules described above.

In an alternative embodiment, the comparator 206 determines whether a participant is an active participant or an inactive participant in the call based on a comparison between the speech activity of all the participants in the call. In this embodiment the comparator 206 determines whether a participant is an active participant or an inactive participant in the call based on a comparison between the length of time that each of the participants has been speaking i.e. the length of time that each of the participants' sound level is above the sound level threshold.

In a further alternative embodiment, the minimum time period (Xms) is adapted to be dependent on the length of time that the user has been speaking i.e. the length of time that the user's sound level is above the sound level threshold. In this embodiment the minimum time period (Xms) could be extended based on the length of time that the user has been active for. In this case the speaker is less likely to be demoted from the stage area 302 to the roster area 304 if he is a particularly active speaker.

In a further alternative embodiment, the minimum time period (Xms) is adapted to be dependent on the length of time that one or more other users in the call have been speaking i.e. the length of time that the one or more other users' sound level is above the sound level threshold. In this embodiment the minimum time period (Xms) may be increased in dependence on the time that one of the other users has been an active participant or in dependence on an average active period for all the call participants wherein the average active period is the average time that all of the participants in the call has been active.

The comparator 206 determines which one of a plurality of participants in the call is elevated to active participant or demoted to inactive participant soonest when more than one user starts and stops speaking at the same time during a call. In this embodiment the comparator 206 is configured to monitor all participants' activity during an entire call and when multiple participants start and stop speaking at the same time, the comparator 206 determines that of these participants, the one who has spoken the most during the call is elevated to the stage area 302 as an active participant sooner over the other participants in the call. It follows that an active participant already in the stage area 302 who starts and stops speaking at the same time as other participants in the call will be demoted to the roster area 304 sooner than any other active participant based on having spoken the least during the call.

Figure 5:
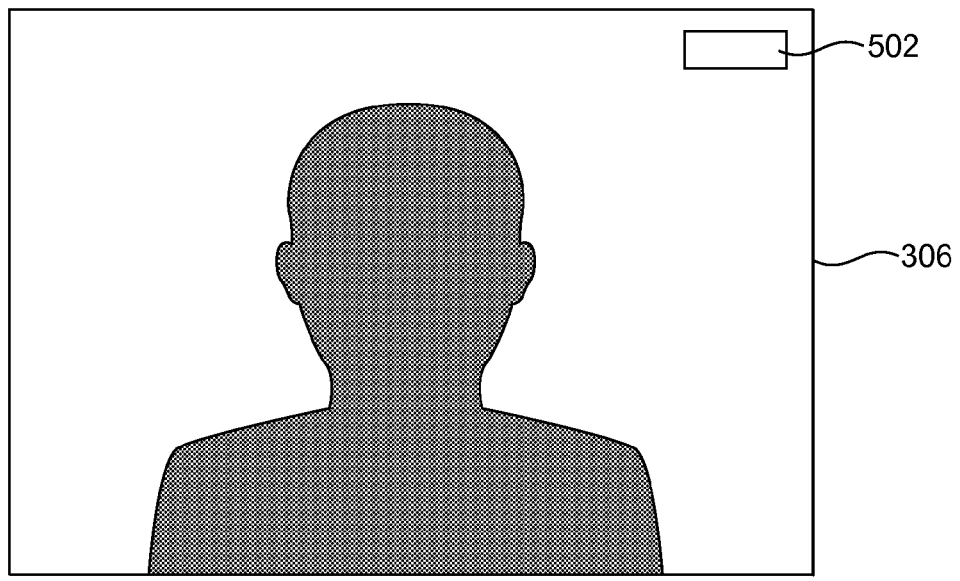
FIG. 5 shows a participant of a video call displayed in the user interface.

As illustrated in FIG. 5, a user may make manual adjustments to the display area 300.

A user may want to manually override some parts of the system's behavior to forcibly elevate or demote someone.

In one embodiment, this manual override is implemented using a button 502 positioned in each of the participant's video or avatar 306. A user clicking the button 502 to an ON state 704 will force the participant to stay where it is currently being displayed (either in roster area 304 or on the stage area 302) disregarding any speech activity in subsequent time intervals. This user is referred hereinafter as being "pinned" to either the roster area 304 or on the stage area 302.

A user selection of the button 302 to an OFF state will set the participant to normal mode to abide to normal rules in subsequent time intervals.

If a user clicks in the participant's video or avatar 306 where the participant has been forced to stay where it is currently being displayed, the pinned participant is switched between "forced on stage" and "forced into roster" and remains in the switched position disregarding any speech activity in subsequent time intervals.

In this embodiment, if a user clicks in an inactive participant's video or avatar 306, where the inactive participant has not been forced stay where it is currently being displayed i.e. is not pinned, the system acts as though the inactive participant's sound level is above the sound level threshold for a minimum time period (Xms) and raises the inactive participant to join the active participants displayed in the stage area 302, as shown in FIG. 6*a*. Following this transition, the now active participant will abide to normal rules in subsequent time intervals In this embodiment, if a user clicks in an active participant's video or avatar 306, where the active participant has not been forced to stay where it is currently being displayed i.e. is not pinned, the system acts like the active participant's sound level is below the sound level threshold for a minimum time period (Xms) and demotes the active participant to join the inactive participants displayed in the roster area 304, as shown in FIG. 6*b*. Following this transition, the now inactive participant will abide to normal rules in subsequent time intervals.

In an alternative embodiment, there is no explicit ability to pin a participant to stay where they are currently being displayed (either in the roster area 304 or in the stage area 302) using an associated button.

In this alternative embodiment, if a user makes a selection in a participant's video or avatar 306 the location of the video or avatar 306 is switched between the stage area 302 and the roster area 304 and the participant is pinned in the new location, disregarding any speech activity in subsequent time intervals.

In this alternative embodiment, if a user makes a selection in participant's video or avatar 306, where the participant has been pinned, the location of the video or avatar 306 is switched between the stage area 302 and the roster area 304 and the participant will abide to normal rules in subsequent time intervals.

Figure 7C:
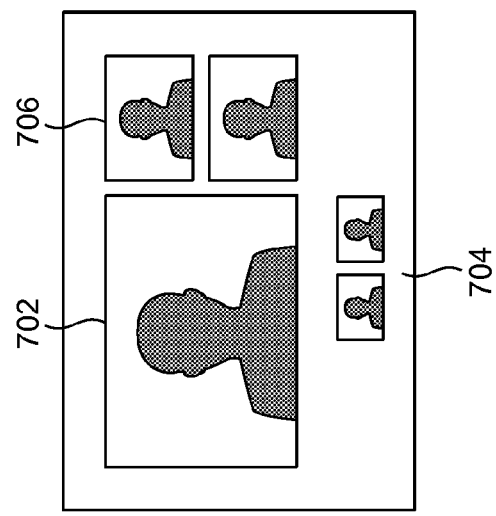
FIGS. 7a, 7b and 7c show example display templates.
Figure 7B:
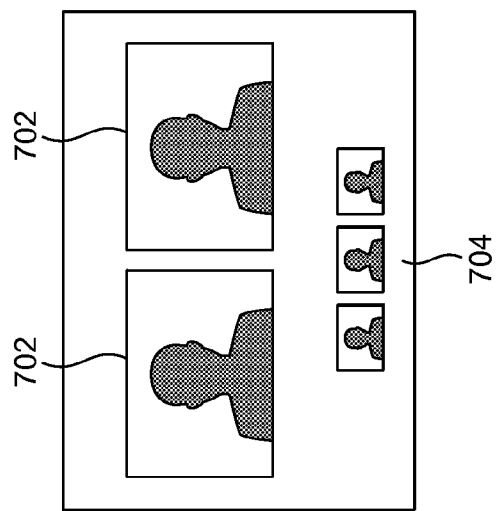
Figure 7A:
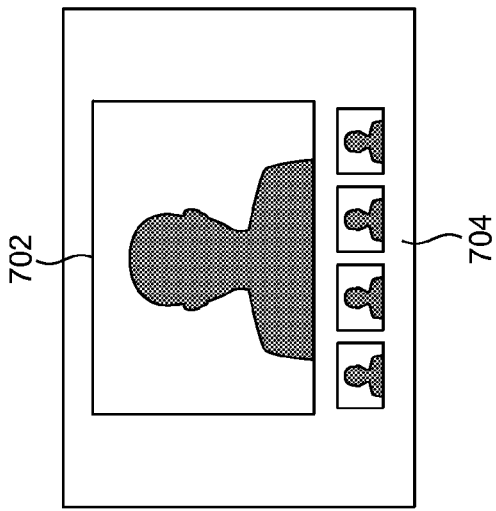

With reference to FIG. 6*c*, in another alternative embodiment, a user can activate a manual override by clicking in an active participant's video or avatar 306 currently displayed in the stage area 302, and any other participants currently in the stage area 302 are demoted to the roster area 304. The demoted participants remain pinned to the roster area 304 while the selected participant remains pinned to the stage area 302. In this embodiment, when a user clicks in an inactive participant's video or avatar 306 currently displayed in the roster area 304, that selected participant is elevated and pinned to the stage area 302 and any other participants that currently are displaying in the stage area 302 are demoted and pinned to the roster area 304. In this way a single participant is pinned to the stage area 302 while all other participants are pinned to the roster area 304. All participants remain pinned, disregarding any speech activity in subsequent time intervals. In this embodiment the manual override is terminated and participants return to abiding to normal rules in subsequent time intervals upon a user clicking 'play' button 308 displayed to the left-hand side of the roster area 304. With reference to FIGS. 7*a*, 7*b*, and 7*c*, an embodiment to further reduce the amount of movement on the screen will now be described.

In this embodiment a distinction is made between participants that speak the most and archive participants that speak a lot. The number of slots in the stage area can adapt accordingly.

In this embodiment, a call starts with everyone in the roster area 304. As soon as a participant picks up this is elevated to the stage area adding a slot until two slots on stage are shown. Following participants that pick up replace the less active speaker afterwards while maintaining a maximum two slots on stage. During this initiation period the stage has maximum two slots available to display participant picking up and speaking. All the others are shown in the roster area. After the initiation period the layout can change to one slot on stage if there is a single participant that is speaking most of the time. After the initiation period the layout can change to show three slots on stage if there are three or more participants that speak a lot.

In this embodiment, speakers occupy slots in a template based on their speech activity.

FIGS. 7*a*, 7*b*, and 7*c* show three possible templates of the display 300. The templates in FIGS. 7*a*, 7*b*, and 7*c* show the primary speakers 702 being displayed more prominently than the secondary speakers 706, who themselves are displayed more prominently than the audience participants 704 in the call. It will be appreciated that any number of templates having different layouts for the participants may be used and the examples shown in FIGS. 7a, 7b, and 7c are not limiting in any way.

The choice of template is done automatically by the comparator 206 in conjunction with the timing analysis block 205 by analyzing conversation intensity. Conversation intensity is defined by how many people are involved in the conversation within a certain interval of time.

The lowest intensity conversation is when no one is speaking. As the number of participants speaking within a certain interval of time in the video is increased, the higher the conversation intensity.

FIG. 7a shows the template that is sent from the memory store 208 to the display driver 210 when a primary speaker 702 talks to an audience 704 in the video call.

When the primary speaker 702 is talking, the timing analysis block 205 monitors the speech activity of the audience 704 to determine if the conversation intensity has changed.

In one scenario, the primary speaker 702 may be giving a presentation to the audience 704 over the video call, during which the primary speaker 702 may finish his presentation and pass over to one of the participants in the audience 704. In this scenario the conversation intensity will not change provided there remains only one participant speaking within the certain interval of time, therefore the template will remain the same. The new primary speaker will replace the previous primary speaker and thus be displayed more prominently. The replacement is instantaneous, minimizing the amount of movement on the screen.

When the timing analysis block 205 and comparator 206 detect that there is a primary speaker 702, the display area 300 at the terminal of said primary speaker 702 is not changed from its current template. In this situation, the slots in the template are configured to display the video or avatar 306 of all other participants in the call by continually swapping on a rotational basis, over a period of time e.g. every 10 seconds, which participants occupy the slots. The primary speaker 702 is thus provided with a display area 300 that simulates a presentation scenario whereby the primary speaker can look around at everyone in his audience.

In another scenario during a presentation by a primary speaker 702 where the template shown in FIG. 7a is being used, one of the participants in the audience 704 may become involved in the presentation and therefore two participants of the video call will be speaking within the certain interval of time and therefore the conversation intensity will increase. The timing analysis block 205 will detect the increase in conversation intensity and the comparator 206 will change the template to display the two participants as shown in FIG. 7b.

As shown in FIGS. 7b and 7c the templates that may be sent to the display driver 210 from the memory store 208 can have one or more locations for primary speakers 702, secondary speakers 706 and the audience 704. When the comparator 206 detects a change in the conversation intensity the comparator 206 will either change the template or will automatically control the display driver 210 to elevate/demote a participant dependent on their speech activity within the template without changing the template.

For example, with reference to FIG. 7b, if a participant in the audience 704 becomes involved in the conversation, the new speaker will replace the least active primary speaker 702. Similarly, with reference to FIG. 7c, if a participant in the audience 704 becomes involved in the conversation, the new speaker will replace the least active secondary speaker 706. In both of these scenarios, the replacement is instantaneous, minimizing the amount of movement on the screen.

It will be appreciated that in this embodiment, the amount of movement on the screen may be reduced by changing the positions of users on the display 300 without changing the layout. This ensures a more stable user experience for the users in the video call.

In a further embodiment, speakers occupy slots in a template based on their speech activity however the choice of template is not done automatically by the comparator 206 in conjunction with the timing analysis block 205. In this embodiment it is the communication client 110 that is executed on the user terminal that selects the template from the memory store 208 to be sent to the display driver 210.

In one implementation of this embodiment, the communication client 110 receives the output of the comparator 206 to determine the average number of active participants during the call and select a suitable template from the memory store 208. In this example, the communication client 110 may determine the number of active participants in a plurality of time periods within the call and then take an average. It will be appreciated that the average number of active participants during the call may be determined over the whole length of the call, the last Z seconds or within a predetermined time period.

In another implementation of this embodiment, the communication client 110 determines how interactive the conversation between the participants of the call is by determining the duration of speech activity for each participant in the call, a selection of a suitable template from the memory store 208 is then made based on this determination. It will be appreciated that the duration of speech activity for each participant in the call may be determined over the whole length of the call, the last Z seconds or within a predetermined time period. If the duration of speech activity of each of the participants in the call is below a predetermined duration the communication client 110 may select a template from the memory store 208 that comprises a plurality of display locations in the stage area 302 of the user interface.

In another implementation of this embodiment, if the duration of uninterrupted speech activity in the call is above a predetermined duration the communication client 110 may select a template from the memory store 208 that comprises a single display location in the stage area 302 of the user interface (as shown in FIG. 7A). This predetermined duration may be the same or a different length compared to the predetermined duration described in the previous implementation. It will be appreciated that the duration of uninterrupted speech activity in the call may be determined over the whole length of the call, the last Z seconds or within a predetermined time period.

In an alternative embodiment the choice of template is done by the user. In this embodiment the templates may be displayed to the user in the user interface that is provided by the client and displayed on the user terminal. The user may access the templates by making a selection in the user interface provided by the client, this may be by way of selecting an icon, selecting a drop down menu or opening a folder and such like.

In response to a user selection of a template in the user interface, the selected template is sent from the memory store 208 to the display driver 210 to display the selected template at the user's terminal.

Once the template has been selected by the user, the participants in the call will occupy slots in the template according to the conversation intensity during the call. When the comparator 206 detects a change in the conversation intensity the comparator 206 will automatically control the display driver 210 to elevate/demote a participant dependent on their speech activity within the template without changing the template. In this embodiment the user may select the template in the process of setting up the call or after the call has begun. Once a template has been selected a replacement template may be selected by the user during the call.

In an embodiment of the invention, the display driver 210 implements transition techniques to smoothly and quickly change the features of display area 300 as opposed to instantaneous replacement. For example when comparator 206 detects that a new speaker should replace another speaker within a template (such as templates in FIG. 7a, 7b or 7c but not limited thereto), or when a user implements the manual override, the new speaker's video or avatar 306 can be faded in to replace the previous speaker's video or avatar 306 which is concurrently faded out. The fade in-fade out replacement transition will typically take 0.3 seconds.

Another form of transition is implemented when changing the display template. When an additional slot is introduced to display another participant in display area 300, existing slots are panned out to make space for the new slot which fades in into the newly created space. The opposite transition occurs when reducing the number of slots in display area 300 I.e. the slot to be removed fades out and remaining slots pan in. The fade in/out typically takes 0.3 seconds while the pan in/out typically takes 0.2 seconds.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with reference to preferred embodiments, it will be understood to those skilled in the art that various changes in form and detail may be made without departing from the scope of the invention as defined by the appendant claims.

What is claimed is:

1. A method of controlling a user interface to display participants of a call based on speech activity in the call, the method comprising:
monitoring the speech activity of the participants in the call;
determining, during a time interval, whether a participant is active or inactive in the call based on the speech activity of the participants over a minimum time period of the call;
in response to determining that the participant is active, displaying the participant in a first area of the user interface;
in response to determining that the participant is inactive, displaying the participant in a second area of the user interface, the first area of the user interface being larger than the second area of the user interface;
controlling the user interface with a manual override to display the participants in the first area or second area of the user interface regardless of speech activity; and
terminating the manual override in response to receiving selection of a play button displayed to one side of the second area in the user interface.

2. A method according to claim 1, wherein displaying the participant comprises displaying an image representing the participant.

3. A method according to claim 1, wherein the determining is implemented at predetermined time intervals during the call, and the method further comprising:
responsive to the determining at a subsequent time interval, automatically transitioning the participant between the first area and the second area of the user interface.

4. A method according to claim 1, the method further comprising:
responsive to a new participant joining the call, automatically transitioning the new participant between the first area and the second area after a period of time.

5. A method according to claim 1, wherein the participant is determined to be active if the speech activity of the participant in the call is above a predetermined threshold for the minimum time period.

6. A method according to claim 1 wherein the participant is determined to be active if a predetermined number of pauses between the speech activity within the minimum time period is not exceeded.

7. A method according to claim 1, wherein determining whether the participant is active or inactive is individually assessed for each participant.

8. A method according to claim 1, wherein determining whether the participant is active or inactive is based on a comparison between the speech activity of all the participants in the call.

9. A method according to claim 8, wherein when the speech activity of the participant and one or more other participants occurs at the same time, the participant who has spoken the least during the call is moved from the first area to the second area before other participants.

10. A method according to claim 1, wherein when said speech activity of the participant and one or more other participants occurs at the same time, the participant who has spoken the most during the call is displayed in the first area before other active participants.

11. A method according to claim 1, wherein the participant most recently transitioned to the second area is displayed furthest to one side in the second area.

12. A method according to claim 1, wherein displaying the participant comprises displaying an image of the participant to one side in the second area of the user interface.

13. A method according to claim 12, wherein said displaying the image of the participant does not form part of the scrollable area and is fixed in the second area of the user interface.

14. A method according to claim 1, wherein the second area of the user interface is configured for scrolling when there are more inactive participants in the call than can be concurrently displayed in the second area of the user interface.

15. A method according to claim 14, wherein the participants are arranged on the display in one of a set of predetermined display configurations, the one of the set of predetermined display configurations being selected based on the determining of active or inactive participants.

16. A method according to claim 15, the method further comprising:
responsive to the determining at the predetermined time intervals, automatically transitioning one of the participants between areas of the predetermined display configuration.

17. A method according to claim 15, the method further comprising:
responsive to the determining at a subsequent time interval, selecting another one of the set of predetermined display configurations.

18. A method according to claim 17, wherein when another one of the predetermined display configurations is selected, slots for any additional participants to be displayed in the user interface are made by panning out existing slots of displayed participants to make space for slots for new participants to be displayed, the new slots being faded in over a period of time.

19. A method according to claim 17, wherein when another one of the predetermined display configurations is selected, any one or more participants be removed from the user interface, are faded out over a period of time and the remaining displayed participants pan in to fill the space left empty by the removed one or more participants.

20. A method according to claim 15, wherein when it is determined that there is one active participant in the call, the currently selected predetermined display configuration of the active participant does not change in response to the determination.

21. A method according to claim 20, wherein all call participants other than the one active participant are displayed in areas of the currently selected predetermined display configuration of the user interface of the one active participant.

22. A method according to claim 21, wherein after a period of time the participants displayed in the areas of the currently selected predetermined display configuration are all swapped for any other call participants.

23. A method according to claim 22, wherein the call participants are continually swapped on a rotational basis, each swap occurring after a predetermined period of time.

24. A method according to claim 1, wherein during connecting the call, prior to any participant speaking, participants are arranged in the first area, second area, or both the first and second areas of the user interface.

25. A method according to claim 24, wherein the participants are arranged in alphabetical order in the first area and in the second area.

26. A method according to claim 1, wherein the manual override controls the user interface to display participants in the first area and the second area of the user interface regardless of the result of the determining at a subsequent time interval.

27. A method according to claim 1, wherein the manual override controls the user interface to display one participant in the first area of the user interface and all other participants in the second area of the user interface.

28. A method according to claim 1, wherein the manual override is terminated upon commencing the determining during a subsequent time interval.

29. A method according to claim 1, wherein automatic transitions between the first and second areas of the user interface are configured to fade-out an existing participant display image over a period of time and concurrently fade-in a new participant display image over the same period time.

30. A computer-readable storage memory, comprising stored instructions executable by a processor to perform operations comprising:
monitoring the speech activity of the participants in a call;
determining, during a time interval, whether a participant is active or inactive in the call in dependence on the participants' speech activity over a minimum time period of the call;
in response to determining that the participant is active, displaying the participant in a first area of the user interface;
in response to determining that the participant is inactive, displaying the participant in a second area of the user interface, the first area of the user interface being larger than the second area of the user interface;
controlling the user interface with a manual override to display participants in the first or second areas of the user interface regardless of speech activity; and
terminating the manual override in response to a user clicking a play button displayed to one side of the second area in the user interface.

31. A computer-readable storage memory according to claim 30, wherein displaying the participant comprises displaying an image representing the participant.

32. A computer-readable storage memory according to claim 30, wherein the determining is implemented at predetermined time intervals during the call, and the instructions further executable to perform:
responsive to the determining at a subsequent time interval, automatically transitioning the participant between the first area and the second area of the user interface.

33. A computer-readable storage memory according to claim 30, the instructions further executable to perform:
responsive to a new participant joining the call, automatically transitioning the new participant between the first area and the second area after a period of time.

34. A user terminal controlled to display participants of a call in dependence upon the speech activity of the participants in the call, the user terminal comprising:
a display configured to display a user interface having first and second areas, the first area of the user interface being larger than the second area of the user interface;
a voice analyzer for monitoring the speech activity of the participants in the call;
a comparator for determining, during a time interval, whether a participant is active or inactive in the call in dependence on the speech activity of the participants over a minimum time period of the call; and
a display driver connected to the display for controlling the user interface to display the participants of the call, the controlling comprising:
in response to determining that the participant is active, displaying the participant in a first area of the user interface;
in response to determining that the participant is inactive, displaying the participant in a second area of the user interface, the first area of the user interface being larger than the second area of the user interface;
responsive to receiving a manual override at the user interface, controlling the user interface to display participants in the first or second areas of the user interface regardless of speech activity; and
terminating the manual override in response to the user clicking a play button displayed to one side of the second area in the user interface.

35. A user terminal according to claim 34, further comprising:
   a timing analyzer configured for:
      analyzing the participant's speech activity using a predetermined set of time intervals within the minimum time period and outputting an analyzed speech signal; and
      comparing the analyzed speech signal with a predetermined threshold for the minimum time period.

36. A user terminal according to claim 34, further comprising:
   a memory for storing a set of predetermined display configurations, wherein one of the predetermined display configurations is selected in response to determining whether the participant is an active participant or an inactive participant in the call.

37. A user terminal according to claim 34, wherein displaying the participant comprises displaying an image representing the participant.

38. A user terminal according to claim 34, wherein the determining is implemented at predetermined time intervals during the call, and the display driver is further configured to perform:
   responsive to the determining at a subsequent time interval, automatically transitioning the participant between the first area and the second area of the user interface.

39. A user terminal according to claim 34, wherein the display driver is further configured to perform:
   responsive to a new participant joining the call, automatically transitioning the new participant between the first area and the second area after a period of time.

40. A user terminal according to claim 34, wherein the participant is determined to be active if a predetermined number of pauses between the speech activity within the minimum time period is not exceeded.

41. A user terminal according to claim 34, wherein determining whether the participant is active or inactive is individually assessed for each participant.

42. A user terminal according to claim 34, wherein determining whether the participant is active or inactive is based on a comparison between the speech activity of all the participants in the call.

43. A user terminal according to claim 34, wherein when said speech activity of the participant and one or more other participants occurs at the same time, the participant who has spoken the most during the call is displayed in the first area before other active participants.

44. A user terminal according to claim 34, wherein when the speech activity of the participant and one or more other participants occurs at the same time, the participant who has spoken the least during the call is moved from the first area to the second area before other participants.

45. A communication system comprising a plurality of user terminals configured to conduct a call over a communication network, wherein at least one user terminal of the plurality of user terminals is configured to perform operations comprising:
   monitoring speech activity of participants in the call;
   determining, during a time interval, whether a participant is active or inactive in the call based on the speech activity of the participants over a minimum time period of the call;
   in response to determining that the participant is active, displaying the participant in a first area of a user interface;
   in response to determining that the participant is inactive, displaying the participant in a second area of the user interface, the first area of the user interface being larger than the second area of the user interface;
   controlling the user interface with a manual override to display the participants in the first area or second area of the user interface regardless of speech activity; and
   terminating the manual override in response to a user clicking a play button displayed to one side of the second area in the user interface.

46. A method of controlling a user interface to display participants of a call based on speech activity in the call, the method comprising:
   monitoring the speech activity of the participants in the call;
   determining, at a predetermined time interval during the call, whether a participant is active or inactive in the call based on the speech activity of the participants over a minimum time period of the call;
   in response to determining that the participant is active, displaying the participant in a first area of the user interface, the first area being an area in one of a set of predetermined display configurations;
   in response to determining that the participant is inactive, displaying the participant in a second area in the one of the set of predetermined display configurations of the user interface, the first area being larger than the second area and the second area of the user interface being configured for scrolling when there are more inactive participants in the call than can be concurrently displayed in the second area of the user interface;
   responsive to the determining at a subsequent time interval, selecting another one of the set of predetermined display configurations wherein new slots for any additional participants to be displayed in the user interface are made by panning out existing slots of displayed participants to make space for the new slots for the additional participants to be displayed, the new slots being faded in over a period of time.

47. A method of controlling a user interface to display participants of a call based on speech activity in the call, the method comprising:
   monitoring the speech activity of the participants in the call;
   determining, at a predetermined time interval during the call, whether a participant is active or inactive in the call based on the speech activity of the participants over a minimum time period of the call;
   in response to determining that the participant is active, displaying the participant in a first area of the user interface, the first area being an area in one of a set of predetermined display configurations;
   in response to determining that the participant is inactive, displaying the participant in a second area in the one of the set of predetermined display configurations of the user interface, the first area being larger than the second area and the second area of the user interface is configured for scrolling when there are more inactive participants in the call than can be concurrently displayed in the second area of the user interface;
   responsive to the determining at a subsequent time interval, selecting another one of the set of predetermined display configurations wherein, any one or more participants to be removed from the user interface are faded out over a period of time and remaining displayed participants pan in to fill a space left empty by the removed one or more participants.

* * * * *